(12) United States Patent
Ham et al.

(10) Patent No.: US 10,285,076 B2
(45) Date of Patent: May 7, 2019

(54) METHOD AND APPARATUS FOR CONTROLLING OF DDN MESSAGE, AND COMPUTER READABLE MEDIUM FOR THE SAME

(71) Applicant: ERICSSON-LG CO., LTD., Seoul (KR)

(72) Inventors: Jae Eun Ham, Seoul (KR); Sang Yong Park, Anyang-si (KR); Sang Woon Park, Gunpo-si (KR); Jae Mo Yeo, Suwon-si (KR); Woon Song Baik, Anyang-si (KR)

(73) Assignee: Ericsson-LG Co., Ltd., Seoul (KR)

( * ) Notice: Subject to any disclaimer, the term of this patent is extended or adjusted under 35 U.S.C. 154(b) by 615 days.

(21) Appl. No.: 14/930,020

(22) Filed: Nov. 2, 2015

(65) Prior Publication Data
US 2016/0135063 A1 May 12, 2016

(30) Foreign Application Priority Data

Nov. 7, 2014 (KR) .................. 10-2014-0154491
Dec. 2, 2014 (KR) .................. 10-2014-0170784

(51) Int. Cl.
*H04L 12/24* (2006.01)
*H04W 24/02* (2009.01)
(Continued)

(52) U.S. Cl.
CPC ......... *H04W 24/02* (2013.01); *H04L 41/0803* (2013.01); *H04W 76/10* (2018.02); *H04W 76/19* (2018.02); *H04W 76/27* (2018.02)

(58) Field of Classification Search
None
See application file for complete search history.

(56) References Cited

U.S. PATENT DOCUMENTS

2009/0179762 A1* 7/2009 Itasaki .............. G06K 7/10069
340/572.1
2009/0285157 A1* 11/2009 Yeoum ............. H04W 36/0022
370/328
(Continued)

FOREIGN PATENT DOCUMENTS

KR   10-2014-0041305 A   4/2014
KR      2014-0041305 A   4/2014
(Continued)

OTHER PUBLICATIONS

ETSI TS 123.401 V.11.3.0 (Nov. 2012) $3^{rd}$ Generation Partnership Project; Technical Specification Group Radio Access Network; LTE General Packet Radio Service (GPRS); Enhancements for Evolved Universal Terrestrial Radio Access Network (E-UTRAN) Access (Release 11); 3GPP TS 23.401; Nov. 2012.
(Continued)

*Primary Examiner* — Alpus Hsu
*Assistant Examiner* — Camquyen Thai
(74) *Attorney, Agent, or Firm* — KED & Associates, LLP

(57) ABSTRACT

The present disclosure relates to a method and device for controlling a Downlink Data Notification (DDN) message, which can reduce the DDN messages that occur while a user equipment transits from an active (ECM-active) state to an inactive (ECM-idle) state. During a bearer activation procedure according to a request from a user equipment, the DDN message control apparatus of the present disclosure sets a DDN flag value to a predetermined value when uplink data is received. When a DDN message is received from outside, the apparatus identifies the DDN flag value and stores the DDN message in case that the DDN flag value is identical with the predetermined value.

13 Claims, 5 Drawing Sheets

(51) Int. Cl.
*H04W 76/10* (2018.01)
*H04W 76/19* (2018.01)
*H04W 76/27* (2018.01)

(56) References Cited

U.S. PATENT DOCUMENTS

| | | | | |
|---|---|---|---|---|
| 2010/0312846 | A1* | 12/2010 | Lu | H04W 68/00 709/206 |
| 2011/0286465 | A1* | 11/2011 | Koodli | H04W 68/00 370/401 |
| 2011/0310868 | A1* | 12/2011 | Yang | H04W 68/00 370/338 |
| 2012/0106456 | A1* | 5/2012 | Jin | H04W 40/02 370/328 |
| 2012/0155404 | A1* | 6/2012 | Shin | H04W 60/04 370/329 |
| 2012/0246325 | A1 | 9/2012 | Pancorbo Marcos et al. | |
| 2012/0276913 | A1* | 11/2012 | Lim | H04W 12/08 455/450 |
| 2013/0003629 | A1* | 1/2013 | Jeong | H04W 52/0216 370/311 |
| 2013/0260810 | A1* | 10/2013 | Rayavarapu | H04W 76/19 455/509 |
| 2014/0016614 | A1* | 1/2014 | Velev | H04W 4/005 370/331 |
| 2014/0101303 | A1* | 4/2014 | Gupta | H04W 28/0252 709/224 |
| 2014/0242962 | A1* | 8/2014 | Choi | H04W 8/245 455/418 |
| 2014/0269779 | A1* | 9/2014 | Shan | H04W 28/24 370/509 |
| 2014/0364156 | A1* | 12/2014 | Iwai | H04W 68/06 455/458 |
| 2014/0372591 | A1* | 12/2014 | Payette | H04L 67/141 709/223 |
| 2015/0003312 | A1* | 1/2015 | Jeong | H04W 52/0235 370/311 |
| 2015/0282083 | A1 | 10/2015 | Jeong et al. | |
| 2016/0128078 | A1* | 5/2016 | Murthy | H04W 28/0205 370/329 |

FOREIGN PATENT DOCUMENTS

| | | |
|---|---|---|
| WO | WO 2013/066350 A1 | 5/2013 |
| WO | WO 2013/143564 A1 | 10/2013 |

OTHER PUBLICATIONS

Korean Office Action dated Aug. 27, 2015 issued in Application No. 10-2014-0170784.
European Search Report dated Mar. 22, 2016 issued in Application No. 15002979.1.

* cited by examiner

METHOD AND APPARATUS FOR CONTROLLING OF DDN MESSAGE, AND COMPUTER READABLE MEDIUM FOR THE SAME

CROSS-REFERENCE TO RELATED APPLICATIONS

This application claims priority under 35 U.S.C. § 119 to Korean Patent Application Nos. 10-2014-0154491 filed on Nov. 7, 2014, and 10-2014-0170784 filed on Dec. 2, 2014, whose entire disclosures are hereby incorporated by reference.

BACKGROUND

1. Field

The present disclosure relates to a field of mobile communication, and more particularly, to a method and an apparatus for controlling of a Downlink Data Notification (DDN) message, which can reduce the generation of DDN messages while a user equipment in an inactive (ECM-idle) state transits to an active (ECM-active) state.

2. Background

Recently, since technologies of communications, computer networks and semiconductor are rapidly developed, various services can be provided via wireless communication networks and consumer's demands for these services are increasing day by day. Further, the wireless internet service market is exploding around the world recently. Accordingly, services provided by mobile communication systems using such wireless communication networks are being developed to a voice service as well as a multimedia communication service for transmitting various data. Since use of smart phones and demand for data traffic are increasing, mobile communication companies are investing in facilities and techniques while considering loads and influences of systems so as to accommodate the increased data traffic in a variety of ways.

Long Term Evolution (LTE), which is a network for realizing requirements of a high data rate, low latency and packet-optimized radio access with respect to access networks, is devised to accommodate high-speed rich media while guaranteeing backward compatibility for the existing 3GPP/non-3GPP access networks. The LTE is an all-IP based network excluding the existing circuit-switched communication and enhances the efficiency of network resources by providing differentiated quality of service (QoS) for real-time services (e.g., a voice communication, a video communication, and the like) and non-real-time services (e.g., web browsing, Store and Forward data transmission, and the like) by means of strengthening of QoS management functions. In addition, the LTE extends bandwidth for wireless communication by adopting smart antenna techniques (i.e., Multiple Input Multiple Output (MIMO)).

An Evolved Packet Core (EPC) network, which is a core network of LTE, performs call processing for voice and data processing in order to provide a service through systematic operations between an eNB (eNodeB) and a Mobility Management Entity (MME), between the MME and a Serving Gateway (S-GW), and between the S-GW and a Packet Data Network-Gateway (P-GW). The EPC network recognizes control messages, such as call setup messages and call release messages, as an Internet Protocol Packet (IP packet), and transfers the control messages to the P-GW or receives the control messages from the P-GW and then transfers the control messages to a user equipment (UE).

If a bearer is established (active state, ECM-Active) to enable radio resources to be used in an LTE system and then the radio resources used for the bearer establishment are not used for a predetermined period of time, the radio resources used for the bearer establishment are released (inactive state, ECM-Idle) for the purpose of efficient use of the radio resources. When the radio resources used for the bearer establishment have been released and then a reception signal then exists for the UE using the corresponding bearer, the S-GW informs the MME of the reception signal through a Downlink Data Notification (DDN) message. At this time, the MME can inform the corresponding UE of the existence of the reception signal through a paging procedure. The corresponding UE transmits a service request message to the MME as a response to the DDN message, thereby requesting reconnection of the radio resources used for the bearer establishment. The UE frequently perform transitions between the active state and the inactive state in order to execute an application, where there is a problem in that a load occurs in EPC equipment since DDN messages are increased in proportion to the number of transitions of the UE.

The above references are incorporated by reference herein where appropriate for appropriate teachings of additional or alternative details, features and/or technical background.

DETAILED DESCRIPTION

This detailed description is provided with reference to the accompanying drawings. One of ordinary skill in the art may realize that the following description is illustrative only and is not in any way limiting. Other embodiments of the present disclosure may readily suggest themselves to such skilled persons having the benefit of this disclosure.

According to an embodiment of the present disclosure, mobile communication networks may include, but may not be limited thereto, a second generation (2G) wireless communication network such as a Global System for Mobile communication (GSM) and a code division multiple access (CDMA) or the like; a wireless internet such as a long term evolution (LTE) network and WiFi or the like; a portable internet network such as Wireless Broadband Internet (Wi-Bro), World Interoperability for Microwave Access (Wi-Max) or the like; a mobile communication network that supports packet transmission (e.g., third generation (3G) mobile communication network such as WCDMA or CDMA2000, or a 3.5G mobile communication network such as high speed downlink packet access (HSDPA) or high speed uplink packet access (HSUPA), a fourth generation (4G) mobile communication network that is currently being serviced; or any other mobile communication network including macro base stations (macro eNodeB), small cell base stations (Pico eNodeB, Home-eNodeB), user equipment (UE) and the like. Hereinafter, embodiments will be described on a basis of an evolved universal terrestrial radio access network (E-UTRAN) that is an LTE radio access network.

Figure 1:
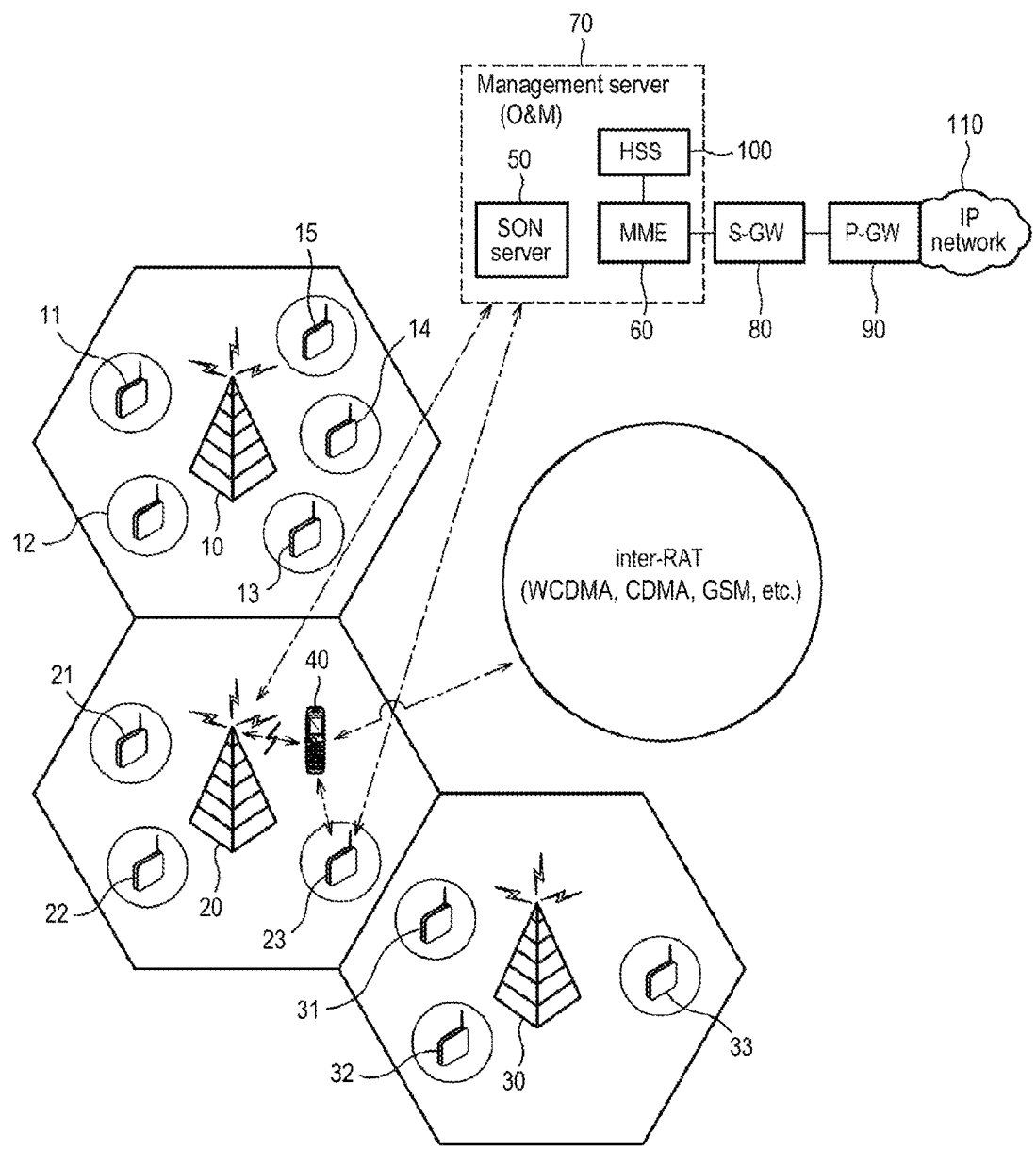
FIG. 1 is a diagram illustrating a configuration of a mobile communication network according to an embodiment of the present disclosure.

As shown in FIG. 1, the mobile communication network may be configured with one or more network cells, and include a Heterogeneous Network (HetNet) environment in which different kinds of network cells are mixed in the mobile communication network. The mobile communication network may include micro base stations (e.g., a Pico eNodeB, a Home-eNodeB, a relay, and the like) 11-15, 21-23, 31-33 for managing small-scale network cells (e.g., Pico cells, Femto cells, and the like), macro base stations (e.g., macro eNodeB) 10, 20, 30 for managing wide range of cells (e.g., macro cells), the UE 40, a Self Organizing & Optimizing Network (SON) server 50, a Mobility Management Entity (MME) 60, a Serving Gateway (S-GW) 80, a PDN (Packet Data Network) Gateway (P-GW) 90 and a Home Subscriber Server (HSS) 100. The respective elements in FIG. 1 are illustrative examples of the embodiment of the present disclosure, and the elements may not be limited thereto.

The macro base stations 10, 20, 30 may include, but are not limited to, characteristics of a macro cell base station for managing cells having a diameter of, for example, about 1 km, which can be used in, for example, an LTE network, a WiFi network, a WiBro network, a WiMax network, a WCDMA network, a CDMA network, a UMTS network, a GSM network or the like.

The micro base stations 11-15, 21-23, 31-33 may include, but are not limited to, characteristics of a Pico base station, an indoor base station, a Femto base station or a relay for managing cells having a diameter of about a few meters to several tens of meters, which can be used in, for example, the LTE network, the WiFi network, the WiBro network, the WiMax network, the WCDMA network, the CDMA network, the UMTS network, the GSM network or the like.

Each of the micro base stations 11-15, 21-23, 31-33 or the macro base stations 10, 20, 30 may have independent connectivity to the core network such as the SON server 50, the MME 60, the S-GW 80, the P-GW 90, the HSS 100, or the like.

The UE 40 may include, but is not limited to, characteristics of mobile terminals used in the 2G wireless communication network such as the GSM network or the CDMA network, the wireless internet network such as the LTE network or the WiFi network, the portable internet network such as the WiBro network or the WiMax network, or the mobile communication network for supporting packet transmission.

A management (O&M) server 70, which is a network management device for the micro base stations, is in charge of configuration information and management of the micro base stations 11-15, 21-23, 31-33 and the macro base stations 10, 20, 30. The management server 70 may perform all the functions of the SON server 50, the MME 60, and the HSS 100. The SON server 50 may include any server that performs functions of installing and optimizing the macro/micro base stations and providing basic parameters and data needed for each of the base stations. The MME 60 may include any entity used for managing mobility and the like of the UE 40. Further, the MME 60 may perform the functions of a Base Station Controller (BSC) and perform resource allocation, call control, handover control, voice and packet processing control, and the like for the base stations (Pico eNodeB, Home-eNodeB, Macro eNodeB and the like) connected to the MME 60. The HSS 100 is a kind of database for service/authentication of a subscriber.

In an embodiment, one management server 70 may perform all the functions of the SON server 50, the MME 60, and the HSS 100; and the SON server 50, the MME 60, and the HSS 100 may manage one or more macro base stations 10, 20, 30 and one or more micro base stations 11-15, 21-23, 31-33.

Although such a network cell in which Macro cells, Pico cells and Femto cells are mixed is assumed in the mobile communication network, the network cell may be configured only with Macro cells and Pico cells, or Macro cells and Femto cells.

Specifically, the micro base stations 11-15, 21-23, 31-33 may broadcast a System Information Block (SIB), which is system information, to a Femto cell region managed by themselves, wherein the SIB includes a Closed Subscriber Group indicator (CSG indicator) for indicating whether access to a corresponding Femto cell is restricted. The SIB is a message of a base station (HeNB or macro eNB) for broadcasting information on cells of the base station to all UE 40, and may include a Cell Global Identity (CGI) (a unique cell-identifying parameter in the network), a CSG indication (a parameter indicating that the base station is the micro station), a CSG ID (an ID of the closed subscriber group), and the like.

In regard to operation, there is an operating function by which access to the macro base stations 10, 20, 30 is usually permitted to all user equipment while access to the micro base stations 11-15, 21-23, 31-33 is restricted to specific UE (subscriber). This is referred to as an access mode or an operation mode, wherein the access mode of the micro base stations 11-15, 21-23, 31-33 are classified into a closed access mode, an open access mode and a hybrid access mode according to which UEs are serviced. The closed access mode (or a CSG closed mode) permits only specific subscribers to access the micro base stations, in a house or the like. In the closed access mode, the CSG indication may be set to "True" and the SIB may include the CSG ID, wherein the CSG indication and the CSG ID are access mode-identifying parameters of the micro base stations transmitted through the SIB. The open access mode (or a CSG open mode) is a mode permitting any subscriber to access the micro base stations without any access-permitting condition in a train station, an airport, a building or the like. In the open access mode, the CSG indication may be set to "False" and the SIB may not include a CSG ID. The hybrid access mode is a mode permitting any subscriber to access the micro base stations in a public place such as a coffee shop, a shopping mall or the like. In the hybrid access mode, the CSG indication may be set to "False" and the SIB may include the CSG ID. However, a difference of the hybrid access mode from the open access mode is that when the CSG ID of a micro base station exists in a white list stored in the UE 40 (where the white list means a CSG ID list of the micro base station accessible by UE 40), a service can be provided to the corresponding UE 40 by high priority, and when the CSG ID of the micro base station does not exist in the white list stored in the UE 40, a service can be provided to a corresponding UE 40 by lower priority.

If it is assumed that the mobile communication network is the LTE network, the LTE network interworks with an inter-RAT network (e.g., the WiFi network, the WiBro network, the WiMax network, the WCDMA network, the CDMA network, the UMTS network, the GSM network or the like). Further, if one of the inter-RAT networks (e.g., the WiBro network) is the mobile communication network, it also interworks with another network (e.g., the LTE network, the WiFi network, the WiMax network, the WCDMA network, the CDMA network, the UMTS network, the GSM network or the like). Although it is illustrated in the figure such that one network (e.g., the LTE network) is spaced apart from other networks (e.g., the WiFi network, the WiBro network, the WiMax network, the WCDMA network, the CDMA network, the UMTS network, the GSM network and the like), it may be assumed that one network and other networks may overlap.

If the micro base stations 11-15, 21-23, 31-33 and/or the macro base stations 10, 20, 30 are collectively named as 'base stations,' the Evolved UMTS Terrestrial Radio Access Network (E-UTRAN) comprised of the base stations (eNBs in FIG. 2) 25-n of LTE processes data traffic between the UE 40 and the core network by using an IP-based flat structure. The MME 60 is in charge of signal control between the UE 40 and the core network. The MME 60 is in charge of signal control between the eNB 25-n and the S-GW 80 and determines a direction of routing a data inputted from the UE 40. The S-GW 80 is in charge of an anchor function for movement of the UE between eNBs 25-n and between a 3GPP network and the E-UTRAN, and accesses the IP network 110 via the P-GW 90. The MME 60/S-GW 80, which are core network devices, are in charge of a plurality of eNBs 25-n, wherein each eNB 25-n is configured with several cells. S1 interfaces (references "S1-MME" and "S1-U" illustrated in FIG. 2) are used between the eNB 25-n and the MME 60/S-GW 80, while X2 interfaces (not shown) are used for SON functions and handover between the eNBs 25-n.

A setup of a network interface is accomplished by setting an S1 interface for connection to the MME 60 located at the center of the system, and an X2 interface that is a network line for direct communication with eNBs 25-n of other cells that are currently existing on the system. The S1 interface sends and receives Operation and Management (OAM) information for supporting movement of the UE 40 by exchanging signals with the MME 60. Further, the X2 interface serves to exchange information on a load indicator and signals for fast handover among the eNBs 25-n and information on self-optimization.

Figure 2:
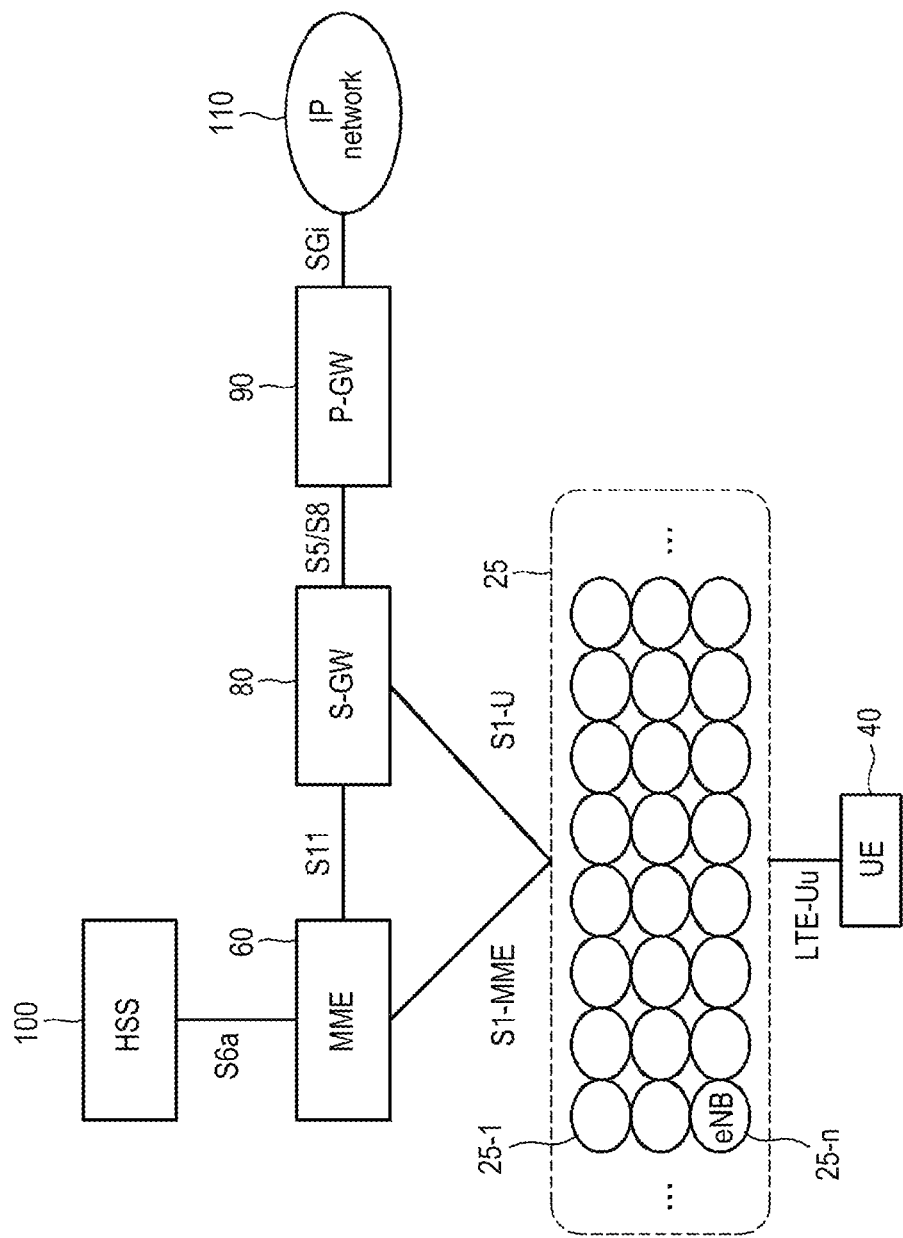
FIG. 2 is an exemplary view illustrating a configuration of an evolved packet core (EPC) network according to an embodiment of the present disclosure.

FIG. 2 is an exemplary view illustrating a configuration of an EPC network according to an embodiment of the present disclosure.

The E-UTRAN 25 is an IP-based radio access network of LTE comprised of eNBs 25-1-25-n and is positioned between the UE 40 and a wireless communication core network so as to transfer data and control information. Further, when the UE using the LTE system utilizes a voice service, the E-UTRAN 25 supports a function of requesting paging for the purpose of Circuit Switch (CS) Fallback so as to allow the UE to move to an existing 2G/3G mobile communication network and receive the voice service, a function of transferring SMS messages to the UE 40, and a function of directly connecting to a target cell enabling a CS service.

In FIG. 2, "LTE-Uu" may represent a wireless interface between the E-UTRAN 25 and the UE 40, "S1-MME" may represent an interface between the MME 60 and the E-UTRAN 25, "S1-U" may represent an interface between the S-GW 80 and the E-UTRAN 25, "S11" may represent an interface between the S-GW 80 and the MME 60, "S5/S8" may represent an interface between the P-GW 90 and the S-GW 80, and "SGi" may represent an interface between the IP network 110 and the P-GW 90. Further, "S6a" may represent an interface between the HSS 100 and the MME 60.

The UE 40 communicates with the eNBs 25-1-25-n of the E-UTRAN 25 via a Radio Resource Control (RRC) protocol, and a broadcasting message from the eNB 25-n to a cell region controlled by the eNB 25-n is defined as an RRC message. The RRC message may include control messages coming down from the Non-Access Stratum (NAS) protocol, and the control messages are not read in the E-UTRAN 25 but transparently transferred to the UE 40 or the core network.

The eNB 25-n is a termination point for a wireless signal of the E-UTRAN 25, wherein a control signal is associated with the MME 60 through the S1-MME interface, and data traffic is associated with the S-GW 80 via the S1-U interface. The S-GW 80 performs an anchor function for mobility within the E-UTRAN 25 and a buffering function for downlink traffic. The P-GW 90 is a connection point of the external IP network 110 and performs IP allocation and charging for a mobile subscriber and a traffic control function for user data.

The IP network 110 provides the UE 40 with an IP Multimedia Subsystem (IMS) service in the EPC network, and may include a Policy & Charging Rule Function (PCRF), IMS nodes (e.g., a Proxy Call Session Control Function (P-CSCF), an Interrogating Call Session Control Function (I-CSCF), a Serving Call Session Control Function (S-CSCF), an Application Function (AF)), and the like.

The UE 40 sends and receives call control messages for multimedia services by using the IMS nodes and a Gm interface through an EPC bearer (provided by the E-UTRAN/S-GW/P-GW).

The E-UTRAN 25 provides the UE 40 with a wireless communication function, and performs a function of managing radio resources for the wireless communication function.

The MME 60 may receive authentication information for authenticating the UE 40 from the HSS 100, and then perform authentication of the UE 40. Further, the MME 60 may manage mobility of the UE 40 and the eNB 25-n at a higher level of the eNB 25-n, and perform a call control function such as establishment/release of an Evolved Packet System (EPS) session and a bearer. The mobility and session control between the UE 40 and a network is processed by a NAS protocol in a Non-Access Stratum (NAS) layer positioned on a control plane of the UE 40 and the MME 60; and the UE 40 and the MME 60 communicate with each other via a NAS message. The NAS function is largely divided into an EPS Mobility Management (EMM) function and an EPS Session Management (ESM) function. Furthermore, the MME 60 may be directly connected to the IP network 110 via the S-GW 80 and the P-GW 90. A call-processing control signal of the eNB 25-n is transferred to the S-GW 80 via the MME 60, and an operation-requesting message needed for call processing can be transmitted to the P-GW 90 according to the call-processing control signal. The EMM is a sublayer positioned in the NAS layer; and the UE 40 has seven EMM states and the MME 60 has four EMM states, as an EMM procedure is performed. A signaling connection for transferring the NAS message should be established between the UE 40 and the MME 60 so that the UE 40 and the MME 60 may send and receive the NAS message, wherein the signaling connection is referred to as an EPS Connection Management (ECM) connection. The ECM connection is a logical connection, and is actually comprised of an RRC connection established between the UE 40 and the eNB 25-*n* and an S1 signaling connection established between the eNB 25-*n* and the MME 60. That is, establishment/release of the ECM connection means establishment/release of both the RRC connection and the S1 signaling connection. If the ECM connection is established, it means that the RRC connection is established, when viewed from the UE 40, while the S1 signaling connection is established, when viewed from the MME 60. The ECM connection has an ECM-connected (connection established) state and an ECM-idle (connection released) state according to presence or absence of establishment of the NAS signaling connection, i.e., establishment of the ECM connection. The ECM connection frequently transits between the ECM-connected state and the ECM-idle state according to the EMM procedure, where this process of transition is referred to as a state transition.

The S-GW 80 may serve as a gateway between the 3GPP network and the E-UTRAN 25 and perform a mobility anchor function for providing handover between the eNBs 25-*n* and the mobility of the UE 40 between 3GPP networks (inter-3GPPs). The S-GW 80 may transmit operations needed for the call processing to the P-GW 90 according to the control signal of the eNB 25-*n*.

The P-GW 90 may allocate an IP address to the UE 40 and apply different QoS policies to respective UEs 40. Further, the P-GW 90 serves as the gateway to a Packet Data Network (PDN) so as to enable UE 40 to access the internet or a data network like the internet and receive a service.

In an embodiment, although it is shown that the S-GW 80 and the P-GW 90 are separated and communicate with each other via the S5/S8 interface, the S-GW 80 and the P-GW 90 may be implemented as a single gateway.

The HSS 100 may manage authentication information for authenticating the UE 40, position information on the UE 40, and a profile of the UE 40. The profile of the UE 40 may include QoS class information (e.g., priority, available maximum bandwidth, and the like) suitable for a service product subscribed by the UE 40. In an embodiment, the authentication information for authenticating the UE 40 and the profile of the UE 40 can be transferred from the HSS 100 to the MME 60 when the UE 40 connects to a network.

The PCRF (not shown) manages policies and charging rules, and allows the P-GW 90 and the S-GW 80 to provide the UE 40 with suitable QoS and to perform a charging function for a used bearer.

The IMS node (not shown) is specifically configured with nodes such as the P-CSCF, the I-CSCF, the S-CSCF, the AF and the like, and provides the UE 40 with a multimedia service such as Voice over IP (VoIP) and a video call.

Figure 3:
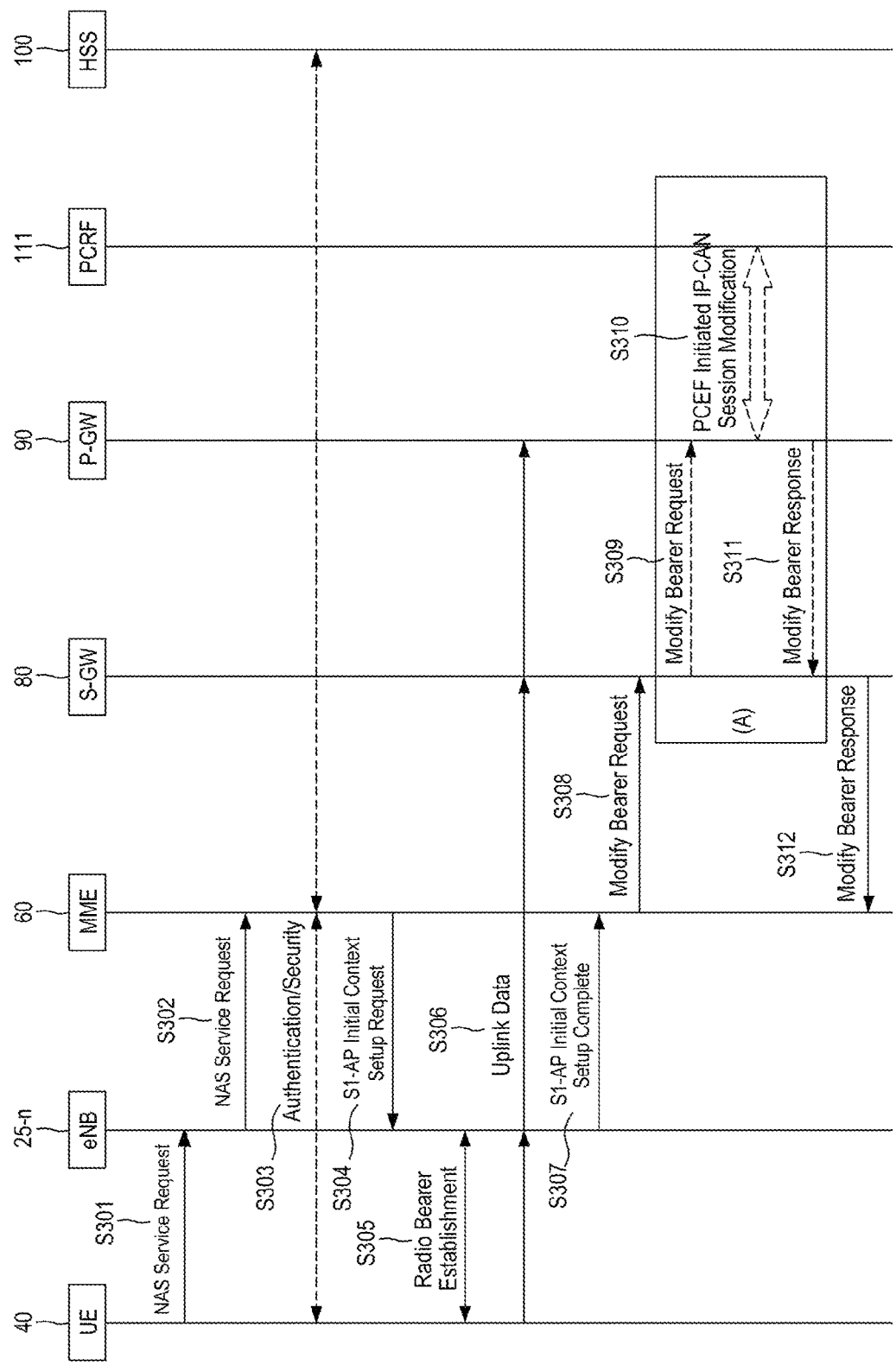
FIG. 3 is an exemplary view illustrating a call processing procedure for a service request in the EPC network according to an embodiment of the present disclosure.

FIG. 3 is an exemplary view illustrating a call processing procedure for a service request in the EPC network according to an embodiment of the present disclosure.

As shown in FIG. 3, the UE 40 may transmit a NAS Service Request message in the form of the RRC message to the eNB 25-*n* (S301). The RRC message may be used to carry the NAS message. The eNB 25-*n* may transfer the NAS Service Request message, which has been received from the UE 40, to the MME 60 (S302). In an embodiment, the NAS Service Request message is an initial UE message that uses an S1 Application Protocol (S1-AP) and may include information such as an S-Temporary Mobile Subscriber Identity (S-TMSI), a CSG ID, a CSG access mode, a Tracking Area Identity (TAI) and an E-UTRAN Cell Global Identifier (ECGI) of a serving cell that provides a mobile communication service. The MME 60 may perform a NAS authentication/reinforcement procedure upon receipt of the NAS Service Request message (S303). Further, the MME 60 may transmit an Initial Context Setup Request message in the form of S1-AP to the eNB 25-*n* (S304). In an embodiment, the Initial Context Setup Request message may include information such as an address of the S-GW 80, a Tunnel Identifier (S1-TEID), the QoS of a EPS bearer, a security context, an MME signaling connection ID, a Handover Restriction List (HRL), a CSG membership indication, and the like. The eNB 25-*n* that has received the Initial Context Setup Request message may perform a radio bearer establishment procedure (S305). If a radio bearer has been established, the UE 40 may transmit uplink data to the S-GW 80 via the eNB 25-*n*; and the S-GW 80 may transmit the received uplink data to the P-GW 90 (S306). Then, the eNB 25-*n* may transmit an Initial Context Setup Completion message to the MME 60 (S307). In an embodiment, the Initial Context Setup Completion message may include information such as an address of the eNB 25-*n*, a list of accepted or rejected EPS bearers, the S1-TEID and the like. Thereafter, the MME 60 may transmit a Modify Bearer Request message to the S-GW 80. In an embodiment, the Modify Bearer Request message may include information such as the address of the eNB 25-*n*, the S1-TEID of an accepted EPS bearer, a delay downlink packet notification request, a Radio Access Technology (RAT) type, and the like. If the S-GW 80 supports a modify access bearers request procedure and the S-GW 80 does not need to transmit a signal to the P-GW 90, the MME 60 may transmit a modify access bearers request message to the S-GW 80 (S308). In an embodiment, the modify access bearers request message may include information such as the address of the eNB 25-*n*, the TEID for a downlink user plane of an accepted EPS bearer, a delay downlink packet notification request and the like. If the RAT type is changed in comparison to the last reported RAT type, the S-GW 80 may transmit the Modify Bearer Request message to the P-GW 90 (S309). If the LTE system adopts dynamic Policy and Charging Control (PCC), the P-GW 90 may interact with the PCRF 111 and acquire a PCC rule according to the RAT type by using an IP Connectivity Access Network (IP-CAN) Session Modification Procedure initiated by a Policy and Charging Enforcement Function (PCEF) (S310). If the LTE system does not adopt the dynamic PCC, the P-GW 90 may apply a local QoS policy. Further, the P-GW 90 may transmit a Modify Bearer Response message to the S-GW 80 (S311). The S-GW 80 may transmit the Modify Bearer Response message to the MME 60 as a response to the Modify Bearer Request message received from the MME 60 at step S308 (S312).

Figure 4:
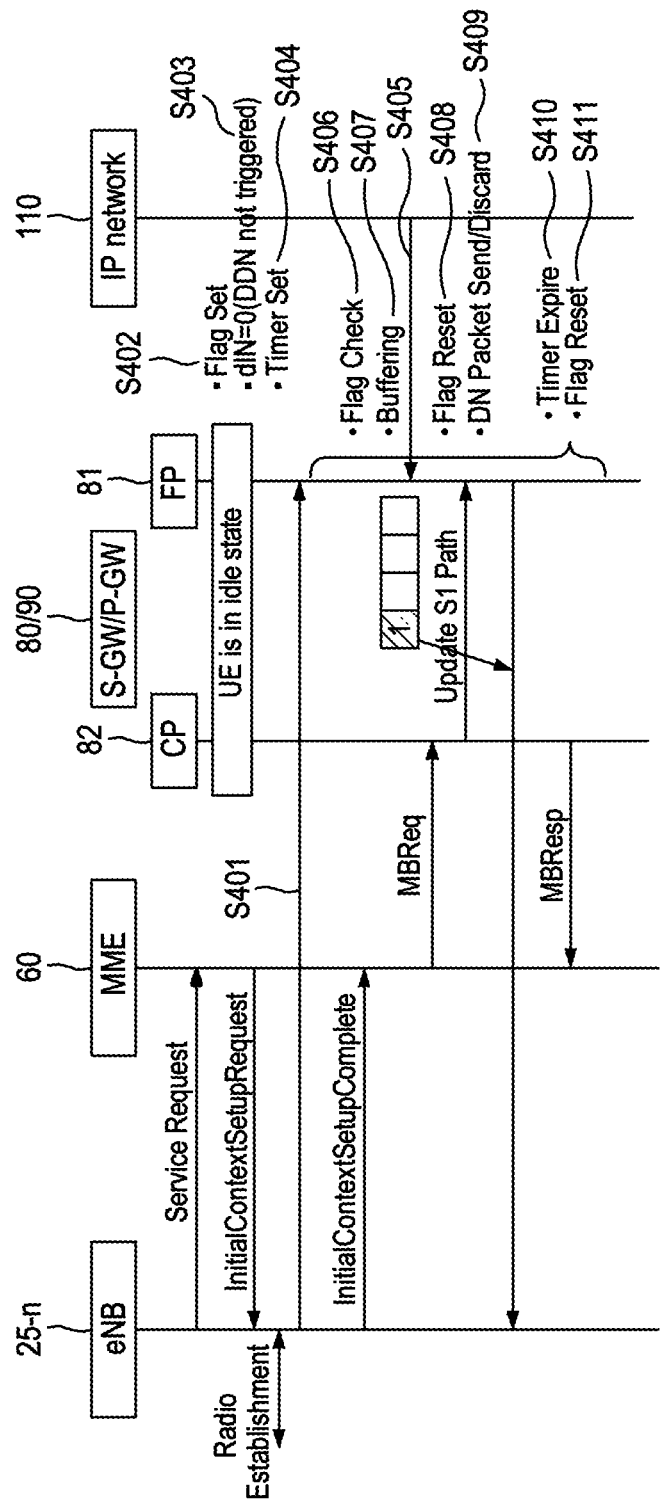
FIG. 4 is an exemplary view illustrating a DDN message control procedure according to an embodiment of the present disclosure.

FIG. 4 is an exemplary view illustrating a DDN message control procedure according to an embodiment of the present disclosure.

If the S-GW 80 receives uplink data from the eNB 25-*n* (S401) while the UE 40 is in an inactive (ECM-idle) state (i.e., while the bearer is in an inactive (preservation) state) as shown in FIG. 4, the S-GW 80 may set a Downlink Data Notification Flag (DDN flag), which is included in the bearer context information registered in a Fast Path (FP) board 81, to a predetermined value, e.g., from 0 (a flag off state or an initialized state) to 1 (a flag on state)(S402). The FP board 81 may represent a logical component for processing mobile communication traffic on the user plane. In this case, in order to indicate that the FP board 81 does not transmit the DDN message to a CP board 82, a Notify Flag referred to as dIN may be reset (e.g., set to 0) (S403). The CP board 82 may represent a logical component for processing mobile communication traffic on the control plane. Further, the FP board

81 may activate a flag timer having a predetermined time (e.g., 50 to 12750 msec) (S404). Then, if data received from the IP network or the IP Multimedia Subsystem (IMS) 110 exists and thus the FP board 81 receives the DDN message (S405), the FP board 81 may check whether the DDN flag is set to 1 (S406). If the DDN flag is set to 1, the FP board 81 may set such that the DDN message is not transmitted to the CP board 82 and the received DDN message and the downlink data are buffered (S407). Then, if the FP board 81 receives the Modify Bearer Response message from the P-GW 90, the FP board 81 may determine that the activation (ECM-active) of the bearer is completed, set the DDN flag to 0 (S408), and stop the operation of the flag timer. Further, if the FP board 81 determines that the activation of the bearer is completed, the FP board 81 may remove the buffered DDN message and transmit the downlink data to the eNB 25-n via the activated bearer; and if the FP board 81 determines that the activation of the bearer is not completed, the FP board 81 may transmit the buffered DDN message to the CP board 82 (S409). Meanwhile, if the flag timer expires before the Modify Bearer Response message is received from the P-GW 90 (S410), the FP board 81 may set the DDN flag to 0 (S411).

Figure 5:
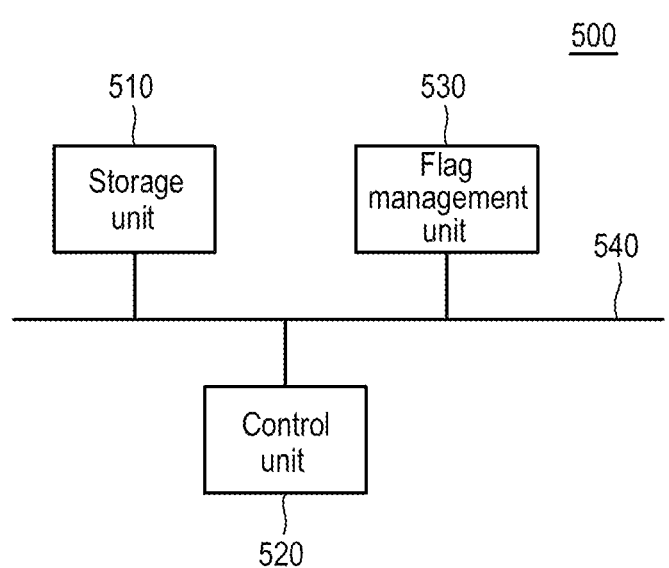
FIG. 5 is an exemplary view illustrating a configuration of a DDN message control device according to an embodiment of the present disclosure.

FIG. 5 is an exemplary view illustrating a configuration of a DDN message control device according to an embodiment of the present disclosure.

As shown in FIG. 5, the DDN message control device 500 may include a storage unit 510, a control unit 520, a flag management unit 530 and a system bus 540. In one embodiment, the storage unit 510, the control unit 520, and the flag management part 530 may be connected to one another through the system bus 540. The DDN message control device 500 may be included in or provided separately from the S-GW 80. Further, although the control part 520 and the flag management part 530 may be implemented as one component (hardware), they may be implemented as separate components.

The storage unit 510 may store DDN messages and downlink data that have not been transmitted from the FP board 81 to the CP board 82 among the DDN messages and downlink data received from the P-GW 90. In one embodiment, the storage unit 510 may include, but is not limited thereto, a buffer, a Read Only Memory (ROM), a Random Access Memory (RAM), a Compact Disc ROM (CD-ROM), a magnetic tape, a floppy disc, an optical data storage device, and the like.

The control unit 520 may form a flag set signal for setting the DDN flag value to a predetermined value, e.g., 1, if the uplink data is received from the eNB 25-n while the bearer is in an inactive (preservation) state, and activate a flag timer to determine whether a predetermined time (e.g., 50 to 12750 msec) has elapsed. If the Modify Bearer Response message is received from the P-GW 90, the control unit 520 may form a flag reset signal for resetting the DDN flag value (e.g., for setting it to 0), stop the flag timer in operation, and control to remove the DDN message stored in the storage unit 510 and to transmit the stored downlink data to the eNB 25-n via the activated bearer. Further, if the flag timer expires before the Modify Bearer Response message is received from the P-GW 90, the control unit 520 may form the flag reset signal for setting the DDN flag value to 0 and control to transmit the DDN message stored in the storage unit 510 from the FP board 81 to the CP board 82. Further, if the DDN message and the downlink data are received from the P-GW 90, the control unit 520 identifies the DDN flag value. If it is confirmed that the DDN flag is set to 1, the control unit 520 may stop the transmission of the DDN message and the downlink data from the FP board 81 to the CP board 82 but instead store them in the storage part 510.

The flag management unit 530 may set the DDN flag value to 1 if the flag set signal is received from the control unit 520 and set the DDN flag value to 0 if the flag reset signal is received from the control unit 520.

According to the present disclosure, a system load of the EPC network can be decreased by reducing the number of occurrences of the DDN messages, which are generated whenever the ECM state of the UE transits.

A method for controlling a downlink data notification (ddn) message according to the present disclosure comprises: during a bearer activation procedure, setting a ddn flag value to a predetermined value when uplink data is received; and if a ddn message is received from outside, identifying the ddn flag value, and storing the ddn message in case that the ddn flag value is identical with the predetermined value.

Further, an apparatus for controlling a downlink data notification (ddn) message according to the present disclosure comprises: a control unit and a storage unit, wherein the control unit, during a bearer activation procedure, controls to set a ddn flag value to a predetermined value when uplink data is received; if the ddn message is received from outside, controls to identify the ddn flag value and to store the ddn message in the storage unit when the ddn flag value is identical with the predetermined value; when a modify bearer response message is received from outside, controls to determine that the bearer activation procedure is completed and to reset the ddn flag value; and when the bearer activation procedure is completed, controls to remove the stored ddn message.

Moreover, a non-transitory computer-readable recording medium for storing a program for performing a method of controlling a downlink data notification (ddn) message, wherein the method comprises: during a bearer activation procedure, setting a ddn flag value to a predetermined value when uplink data is received; and if the ddn message is received from outside, identifying the ddn flag value and storing the ddn message when the ddn flag value is identical with the predetermined value.

Any reference in this specification to "one embodiment," "an embodiment," "example embodiment," "illustrative embodiment," etc. means that a particular feature, structure or characteristic described in connection with the embodiment is included in at least one embodiment of the present disclosure. The appearances of such phrases in various places in the specification are not necessarily all referring to the same embodiment. Further, when a particular feature, structure or characteristic is described in connection with any embodiment, it is submitted that it is within the purview of one skilled in the art to affect such feature, structure or characteristic in connection with other embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for controlling of a Downlink Data Notification (DDN) message comprising:
during a bearer activation procedure, setting a DDN flag value to a predetermined value, by a flag management unit included in a Serving Gateway, when uplink data is received at the Serving Gateway; and
when a DDN message is received, at a control unit included in the Serving Gateway, from outside, identifying the DDN flag value and storing, at a storage unit included in the Serving Gateway, the DDN message when the DDN flag value is identical with the predetermined value,
wherein the setting of the DDN flag value comprises determining whether a pre-set time is elapsed, and
the identifying of the DDN flag value comprises controlling to transmit the stored DDN message to a control plane (CP) board, included in the Serving Gateway, for processing mobile communication traffic on a control plane when the pre-set time has elapsed before the bearer activation procedure is completed.

2. The method of claim 1, further comprising:
removing, by the control unit, the stored DDN message when the bearer activation procedure is completed.

3. The method of claim 2, wherein the completion of the bearer activation procedure comprises receiving, at the Serving Gateway, a Modify Bearer Response message from outside.

4. The method of claim 1, wherein the DDN flag value is 0 or 1, wherein 0 represents a flag off state and 1 represents a flag on state.

5. The method of claim 1, wherein during the bearer activation procedure, user equipment is in an inactive state when the Serving Gateway receives the uplink data.

6. The method of claim 1, wherein setting the DDN flag value includes setting the DDN flag value to a predetermined numeric value.

7. An apparatus for controlling a Downlink Data Notification (DDN) message, the apparatus comprising:
a control unit included in a Serving Gateway, a flag management unit included in the Serving Gateway, and a storage unit included in the Serving Gateway,
wherein the control unit, during a bearer activation procedure, controls to set, by the flag management unit, a DDN flag value to a predetermined value when uplink data is received at the Serving Gateway;
when the DDN message is received from outside, the control unit controls to identify the DDN flag value and to store the DDN message in the storage unit when the DDN flag value is identical with the predetermined value;
when a Modify Bearer Response message is received, at the Serving Gateway, from the outside, the control unit controls to determine that the bearer activation procedure is completed and to reset the DDN flag value; and
when the bearer activation procedure is completed, the control unit controls to remove the stored DDN message from the storage unit included in the Serving Gateway,
wherein the control unit, when the uplink data is received, determines whether a pre-set time is elapsed; and when the pre-set time has elapsed before the Modify Bearer Response message is received at the Serving Gateway, controls to reset the DDN flag value and to transmit the stored DDN message to a control plane (CP) board, included in the Serving Gateway, for processing mobile communication traffic on a control plane.

8. The apparatus of claim 7, wherein the DDN flag value is 0 or 1, wherein 0 represents a flag off state and 1 represents a flag on state.

9. The apparatus of claim 7, wherein during the bearer activation procedure, user equipment is in an inactive state when the Serving Gateway receives the uplink data.

10. A non-transitory computer-readable recording medium for storing a program for performing a method of controlling a Downlink Data Notification (DDN) message, the method comprising:
during a bearer activation procedure, setting, by a flag management unit included in a Serving Gateway, a DDN flag value to a predetermined value when uplink data is received at the Serving Gateway; and
when the DDN message is received, at a control unit included in the Serving Gateway, from outside, identifying the DDN flag value and storing, at a storage unit included in the Serving Gateway, the DDN message when the DDN flag value is identical with the predetermined value,
wherein the setting of the DDN flag value comprises determining whether a pre-set time is elapsed, and
the identifying of the DDN flag comprises controlling to transmit the stored DDN message to a control plane (CP) board, included in the Serving Gateway, for processing mobile communication traffic on a control plane when the pre-set time has elapsed before the bearer activation procedure is completed.

11. The non-transitory computer-readable recording medium of claim 10, wherein the method further comprises:
removing, by the control unit, the stored DDN message when the bearer activation procedure is completed.

12. The non-transitory computer-readable recording medium of claim 11, wherein the completion of the bearer activation procedure comprises receiving, at the Serving Gateway, a Modify Bearer Response message from the outside.

13. The non-transitory computer-readable recording medium of claim 10, wherein during the bearer activation procedure, user equipment is in an inactive state when the Serving Gateway receives the uplink data.

* * * * *